United States Patent [19]

Nagel et al.

[11] Patent Number: 5,749,800
[45] Date of Patent: May 12, 1998

[54] SYNCHRONOUS BELT DRIVE

[75] Inventors: Thomas Nagel, Dresden; Ulf Richard, Frankfurt an der Oder, both of Germany

[73] Assignee: Technische Universitaet Dresden, Dresden, Germany

[21] Appl. No.: 652,557

[22] PCT Filed: Dec. 6, 1994

[86] PCT No.: PCT/DE94/01445

§ 371 Date: Jun. 6, 1996

§ 102(e) Date: Jun. 6, 1996

[87] PCT Pub. No.: WO95/16152

PCT Pub. Date: Jun. 15, 1995

[30] Foreign Application Priority Data

Dec. 7, 1993 [DE] Germany ............ 43 41 572.5

[51] Int. Cl.⁶ .................................. F16H 19/06
[52] U.S. Cl. ..................... 474/84; 474/148; 474/205
[58] Field of Search ...................... 474/84, 148, 150, 474/205

[56] References Cited

U.S. PATENT DOCUMENTS

| | | |
|---|---|---|
| 2,309,578 | 1/1943 | Drachman . |
| 5,006,096 | 4/1991 | Breher ............................ 474/205 X |
| 5,209,705 | 5/1993 | Gregg ............................ 474/205 X |
| 5,382,198 | 1/1995 | Janne ............................ 474/205 |
| 5,421,789 | 6/1995 | Gregg ............................ 474/153 |

FOREIGN PATENT DOCUMENTS

| | | |
|---|---|---|
| 0611255A1 | 8/1994 | European Pat. Off. . |
| 2357928 | 5/1975 | Germany . |
| 2937827 | 4/1981 | Germany . |

OTHER PUBLICATIONS

Antriebstechnik, vol. 32, No. 2, Feb. 1993 pp. 33–36, XP000339270 R. Perneder "Verdrehsteife Roboterantriebe dank Polyurethan–Sychronriemen" see p. 36, paragraph 5; figure 9.

*Primary Examiner*—Roger J. Schoeppel
*Attorney, Agent, or Firm*—Jordan and Hamburg

[57] ABSTRACT

A synchronous belt drive, with a high multiplication ratio for transforming a rotary movement into a translation or rotary movement, has at least two rows of teeth with different pitches interconnected by a toothed belt. The rows of teeth with different pitches engage wheels of at least one pair of wheels secured against independent rotation. The products of the number of teeth of the wheels and the pitch of the corresponding row of teeth differ at least slightly from each other. The pitch difference between the toothed belts gives the drive a high multiplication ratio. Very fine gradations and therefore high multiplication ratios may be achieved, even when the tooth modulus is high for reasons of resistance.

21 Claims, 4 Drawing Sheets

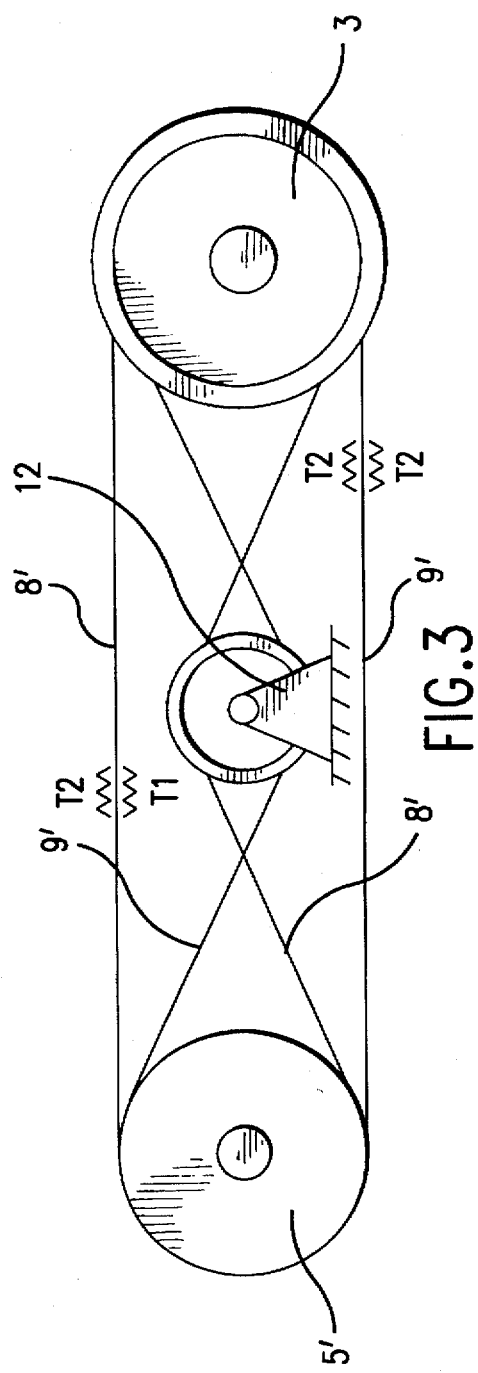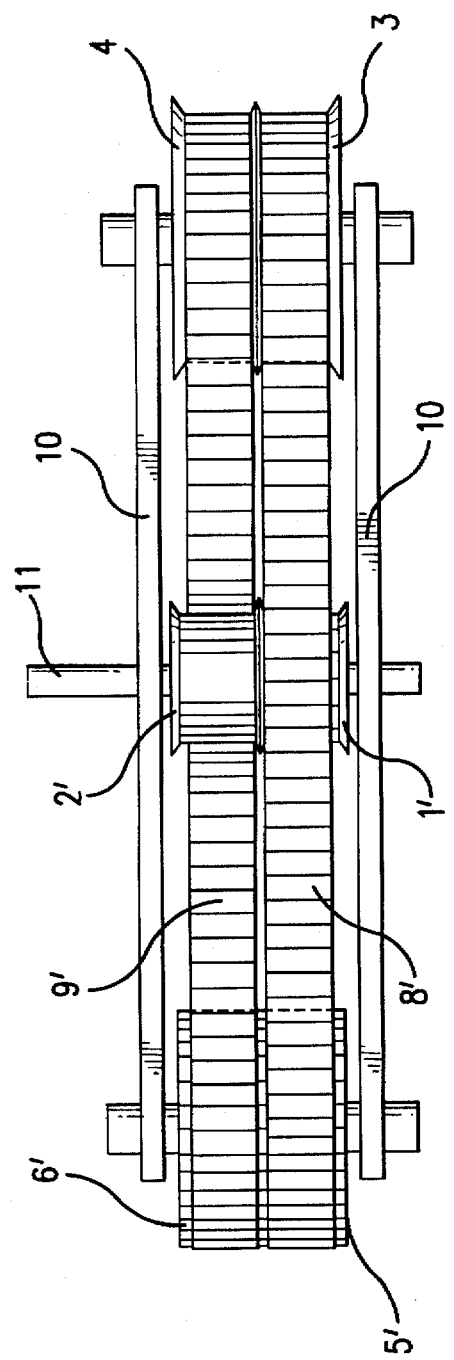

SYNCHRONOUS BELT DRIVE

BACKGROUND OF THE INVENTION

The present invention relates to a synchronous belt drive with a high multiplication ratio for transforming a rotary movement into a translation or rotary movement.

Synchronous belt drives with high multiplication ratios for linear units are known. Mounted on a slide, movable between a driving wheel and a return wheel, are at least two interconnected driven wheels which are secured against independent rotation and on which a toothed belt is pressed with snub pulleys. The differences of the numbers of teeth of the interconnected wheels effect slide travel.

An embodiment produced by the Mulco company has a driven wheel rotated by a top strand and a bottom strand at the same time. A second, smaller gear is connected with the driven wheel. Also one strand of the toothed belt engages the smaller gear.

Another embodiment produced by the CYBERTRON company has two driven wheels equal in size which are engaged with one strand each at the same time. A second gear is attached to each of the two driven wheels. These have a difference in the number of teeth and are interconnected by a second toothed belt so that they are secured against rotation.

A similar embodiment is disclosed in the JP-PS 61-149665. Toothed outer sides of a top strand and a bottom strand are pressed on one driven wheel each. Both driven wheels are connected with each other by a toothed belt so that they are secured against rotation. The wheels of this belt drive (each of them being secured together with the driven wheels) are different in diameter.

The difference in the number of teeth causes a linear movement, i.e., the driven wheels not only rotate but also move parallel to the top strand and the bottom strand. The highest multiplication ratio, and therefore the minimum linear speed, results at the minimum difference possible in the number of teeth.

SUMMARY OF THE INVENTION

It is the object of the invention to provide a synchronous belt drive with a high multiplication ratio.

In accordance with the present invention a synchronous belt drive has a driving wheel, a driven wheel and a return wheel and two interconnected wheels secured against independent rotation. At least two rows of teeth with different pitches interconnected by a toothed belt. The rows of teeth with different pitches are each engaged with one of the wheels of the pair of wheels secured against rotation. The rows of teeth with different pitches can be achieved on the inner or outer side of a toothed belt with double toothing or on the inner or outer sides of two parallel toothed belts.

The drive multiplication ratio is based on the products of the numbers of teeth of the wheels, connected with each other so that they are secured against independent rotation, multiplied by the different pitches of the respective row of teeth engaged with them differing from each other at least slightly. The smaller the product difference is, the higher is the multiplication ratio. This product difference can be preferably accomplished by a difference in the number of teeth of the rows of teeth by at least one tooth for pairs of wheels which are equal and rows of teeth of equal length. In contrast to the drives with a high multiplication ratio having a small difference in the number of teeth of the wheels, such as the harmonic drive, the multiplication ratio is determined not only by the difference in the number of teeth, but also very considerably by the belt length at which this difference of the number of teeth is achieved. The longer the toothed belt is, the smaller is the difference of pitches for the same difference of the number of teeth. After all, very fine gradations and, therefore, high multiplication ratios may be achieved, even when the tooth moduli are high for reasons of resistance.

Toothed belts with double toothing and opposite-sense contact of the inner pair of gears also allow the transmission of high momenta without any essential constructional restrictions.

The drive can be used for linear drives as well as for transforming a rotary movement into another rotary movement. In the second case embodiments are possible in which the multiplication ratio of the drive can be set at fine steps while maintaining a high total multiplication ratio.

BRIEF DESCRIPTION OF THE DRAWING

In the following, the invention will be represented in greater detail referring to several embodiments. In the drawings:

FIG. 3 is a side view of an embodiment of the invention having two parallel toothed belts for a rotary drive;

FIG. 4 is a top view of the embodiment of FIG. 3;

DETAILED DESCRIPTION OF THE INVENTION

Figure 1:
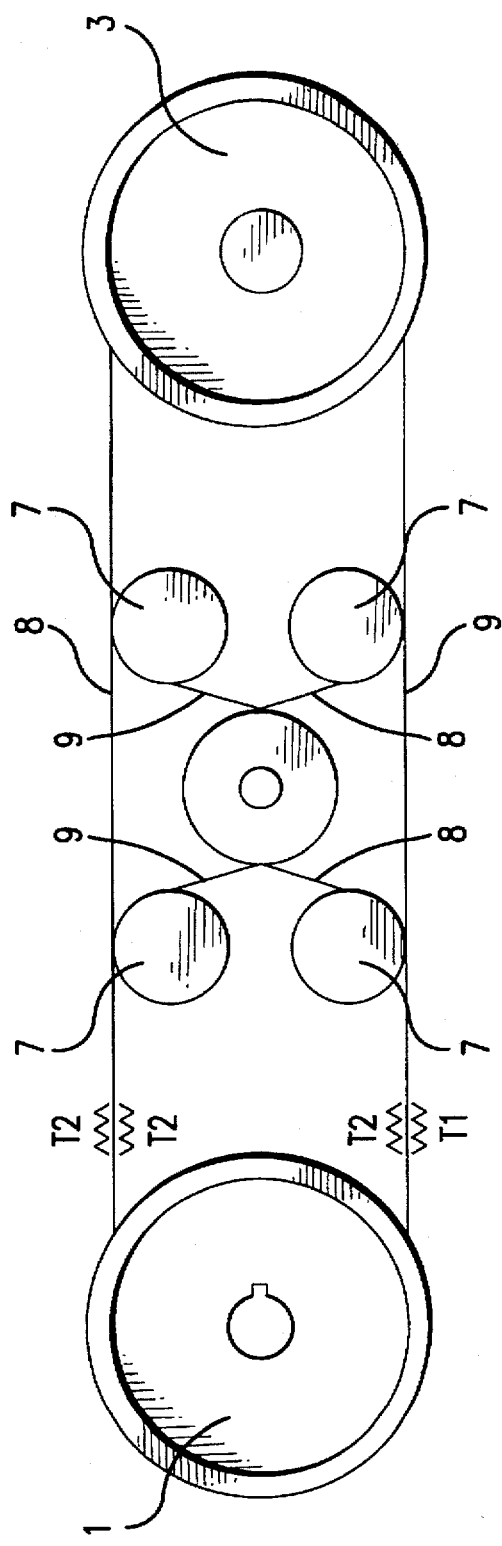
FIG. 1 is a side view of an embodiment of the invention with two parallel toothed belts in a linear drive unit.
Figure 2:
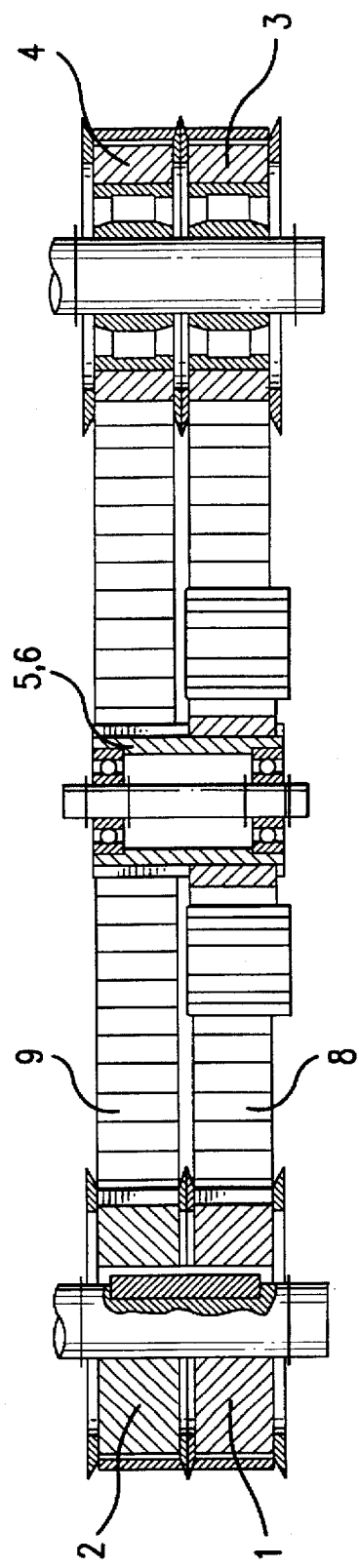
FIG. 2 is a top view of the embodiment of FIG. 1.

Referring to FIGS. 1 and 2, an embodiment of the invention is demonstrated first by a linear drive.

Two toothed belts 8 and 9 with double toothing contact driving wheels 1 and 2, respectively, and return wheels 3 and 4, respectively. Between the driving wheels 1 and 2 and the return wheels 3 and 4 is a slide arranged (not shown) which encompasses the toothed belts 8 and 9. The axles of tension pulleys 7 and of wheels 5 and 6 are mounted in the slide. The bottom strand of the toothed belt 8 runs (when the FIGS. 1 and 2 are viewed, from left to right) from below, over the tension pulley 7 upwards, contacts the wheel 5 on the top, and then runs again from the top downwards around the bottom right tension pulley 7 to the return wheel 3. The top strand of the toothed belt 8 returns to the driving wheel 1 without contacting the tension pulleys 7 or the wheel 5. Conversely, the bottom strand of the toothed belt 9 is directly led from the driving wheel 2 to the return wheel 4, whereas the top strand returns to the driving wheel 2 from the return wheel 4 over the pulleys 7 and the wheel 6.

The wheels 1 and 2 as well as wheels 5 and 6 are connected with each other in pairs, secured against independent rotation, i.e., 1 and 2 or 5 and 6, respectively, always have the same speed. The pitch of the toothed belts is equal on the inner sides, i.e. equal to T2 for both, and different on the outer sides, T1 and T2. For example, let the pitch of the toothed belt 8 on its outer side be greater than that of the toothed belt 9 on its outer side. The toothed belts 8 and 9 move at the same circumferential speed around the driving wheels and return wheels 1 and 2 and 3 and 4. Because of the pitch difference on the outer sides of the toothed belts 8 and 9, if wheels 5 and 6 were independent they would run at different speeds, being rotatable independent of each other. The wheel below the toothed belt 8 would rotate faster than the wheel below the other toothed belt 9. However, since the wheels 5 and 6 constitute an undivided, equally toothed wheel, the common axis of the wheels 5 and 6 moves in dependence on the direction of drive towards the driving wheels 1 and 2 or away from them, and with it moves the slide. The speed corresponds to the slight theoretical speed difference which divided wheels 5 and 6 would have, multiplied by their radius.

Referring to FIGS. 3 and 4, a drive as disclosed by the invention for transforming a rotary movement into another rotary movement is shown.

In contrast to above, inner sides of toothed belts 8' and 9' have different pitches. All wheels are rotatably mounted on a bracket 10 which rotates about an axis of a frame 12. About this axis rotates also a drive shaft 11 which is connected to wheels 1' and 2'. The wheels 5' and 6' engage with the different pitches and act as return wheels. The pitch difference T1 minus T2 effects a slow rotary motion of the bracket 10.

For both the above embodiments there were used toothed belts with double toothing to transmit high momenta with rotational-angular accuracy.

In a third embodiment, the brackets 10 are parts of a fixed frame in which the wheels 1' to 6' are supported.

In a first variant of this third embodiment the wheels 1' and 2' are connected with each other and the wheels 5' and 6' are rotatable independent of each other. For the wheels 5' and 6', a drive of the wheels 1' and 2' effects a common speed with a superimposed low differential speed of both wheels. A multiple-link drive could be connected to wheels 5 and 6.

The same result may be achieved with a second variant when the wheels 5' and 6' are interconnected and wheels 1' and 2' are rotatable independent of each other. A rotary motion initiated with wheel 1' would effect a slightly changed speed at wheel 2'. With the shaft of wheel 1' led through wheel 2' and a hollow shaft of wheel 2', both speeds can be taken from the side of wheel 2'. Between the input speed and the differential speed of the wheels 1' and 2' a high multiplication ratio can be established.

Figure 5:
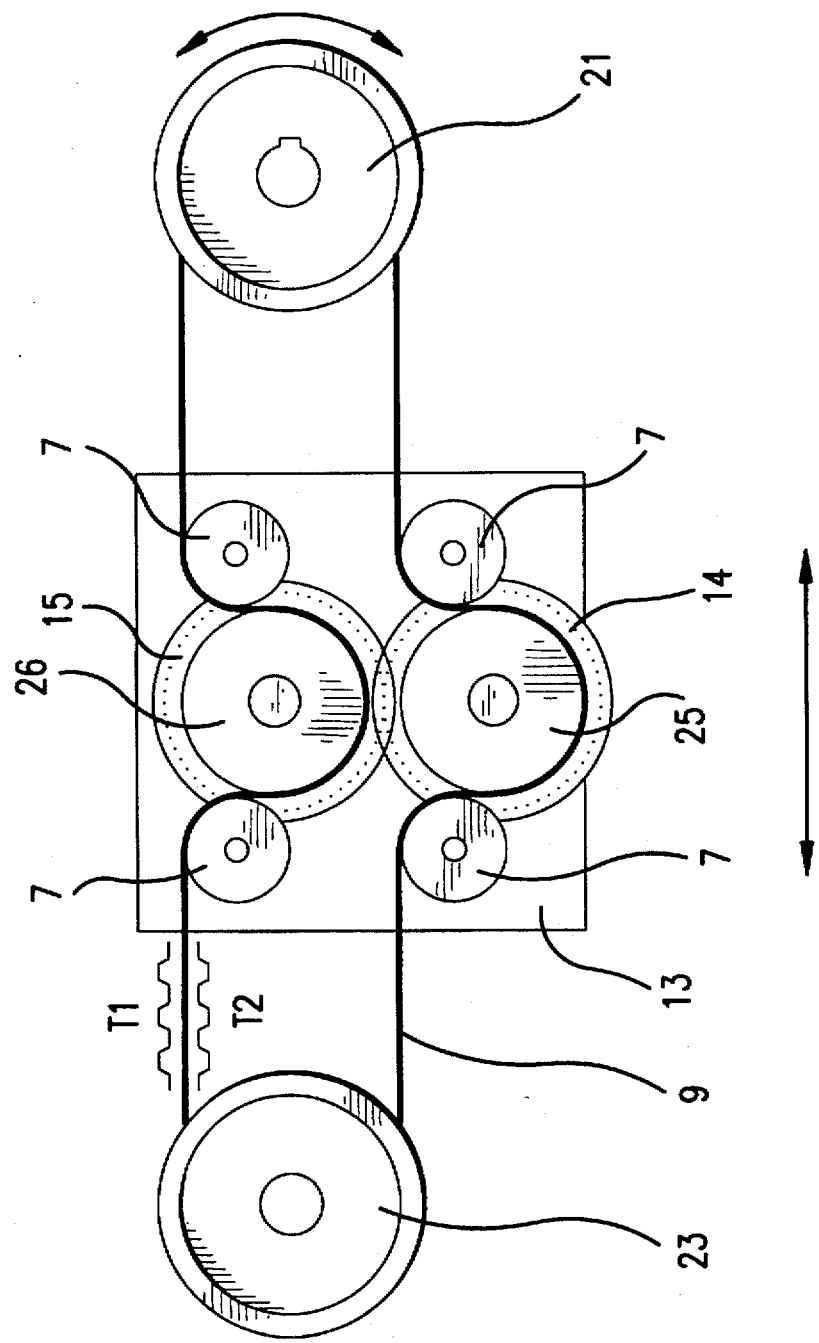
FIG. 5 is a side view of an embodiment of the invention with one toothed belt for a linear drive unit.
Figure 6:
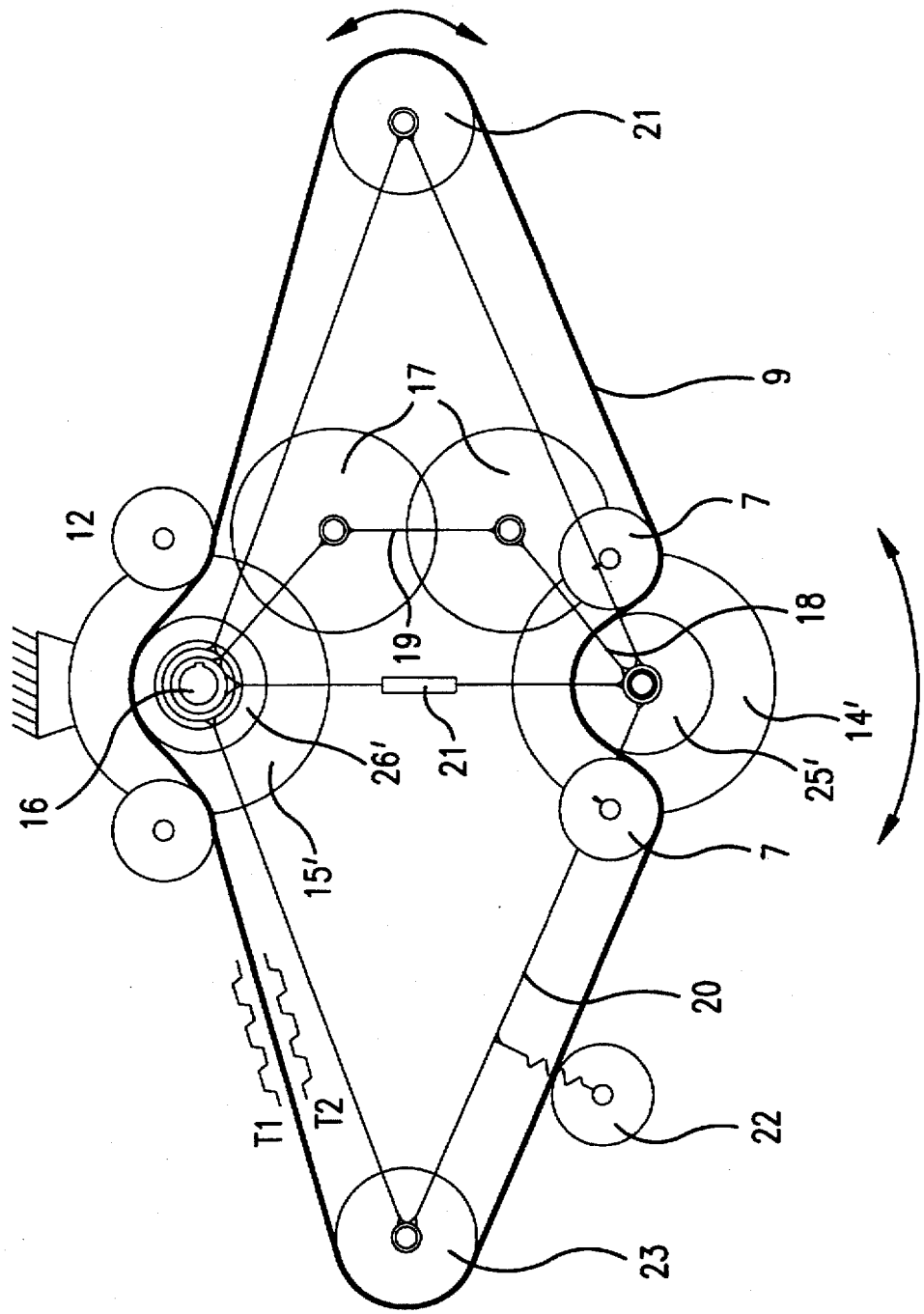
FIG. 6 is a side view of an embodiment of the invention with one toothed belt for a rotary unit with means for changing the multiplication ratio.

Referring to FIGS. 5 and 6, embodiments of the present invention with only one toothed belt 9 each are shown. The belt 9 has double toothing with the different pitches T1 and T2.

FIG. 5 shows a linear drive. In a slide 13, two equal driven wheels 25 and 26 are supported and coupled, secured against independent rotation, with two gears 14 and 15 which are also equal. A toothed belt 9, with double toothing, contacts the driven wheels 25 and 26 and two return wheels 21 and 23. By means of snub pulleys 7 the inner side of the toothed belt 9 is pressed on the driven wheel 25 and with its outer side on the driven wheel 26. The return wheel 21 is driven. Since the wheels 25 and 26 are connected with each other so that they are secured against independent rotation, the slide 13 moves towards the driving wheel 21 or away from it, depending on the direction of drive. The speed corresponds to the slight theoretical difference of speeds which noncoupled wheels 25 and 26 would have, multiplied by their radius.

From the variant shown in FIG. 5, a drive as disclosed by the invention for transforming a rotary movement into another rotary movement is realizable. Instead of the slide 13, a bracket is provided in which the wheels 21 and 23 are supported. One of the driven wheels, e.g. the wheel 26, is designed as the driving wheel. Then, the bracket rotates about the axle of the wheel.

In FIG. 6, a modified embodiment of such a variant is shown. The wheels are not supported in a bracket but by links 20. The spacing between wheels 25' and 26' can thereby be changed. Under otherwise identical conditions, a greater spacing between these wheels results in reduction of the output speed.

Wheel 26' is the driving wheel. Its axle 16 is supported in a frame point. The links 20 form a rhomboidal four-bar linkage. Between the gears 14' and 15', which correspond to those in the first variant that directly connected the two wheels 25 and 26 with each other, secured against independent rotation, a pair of gears 17 is coupled by means of links 18 and a coupler 19. Thus they independently follow the changes of spacing.

Between two adjacent links 20 (in the drawing these are the bottom two) a clamping screw 21 is mounted. By means of it the angle between these two rockers and thus the spacing between the wheels 5 and 6 is adjusted.

Moreover, a tension pulley 22 connected to one of the rockers 20 is provided. Thereby, despite change of the spacing of the wheels 25' and 26', an approximately constant pressure of the pulleys 7 on the toothed belt 9 is ensured.

When the toothed belt 9 is driven, the interconnected links 20 rotate about the axle 16. This rotary motion can be taken in a simple way. For example, a (not represented) driven wheel rotating about the axle 16 could be connected with one of the two rockers 20 coupled to this axle.

We claim:

1. A synchronous belt drive with at least one driving wheel, one driven wheel and one return wheel which are contacted by at least one toothed belt, at least two of the wheels being coupled, secured against rotation, into a pair of wheels secured against rotation, characterized in that at least two rows of teeth interconnected by a toothed belt with different pitches (T1 and T2) are provided, the said rows of teeth with different pitches (T1 and T2) engaging each one of the wheels (5 and 6) of at least one pair of wheels secured against rotation, the products of the number of teeth of the said wheels (5 and 6) by the pitches of the corresponding rows of teeth (T1 and T2) differing at least slightly from each other.

2. A synchronous belt drive as claimed in claim 1, characterized in that the rows of teeth with different pitches (T1 and T2) are at least on one side of a toothed belt with double toothing (9) and the coupled wheels secured against rotation (5 and 6) are coupled counterrotating in one plane.

3. A synchronous belt drive as claimed in claim 1, characterized in that the rows of teeth with different pitches (T1 and T2) are on the same sides, the inner or outer sides, of two parallel toothed belts (8 and 9), two gears which are coupled in pairs, secured against rotation, on one axis each are interconnected so that they are secured against rotation, and the two wheels of the pair of gears secured against rotation mounted inside are contacted in opposite direction by the back of the toothed belt.

4. A synchronous belt drive as claimed in claim 1, characterized in that the wheels of the pairs of wheels secured against rotation are equal in pairs, the rows of teeth with different pitches (T1 and T2) are equal in length and their number of teeth differs by at least one tooth.

5. A synchronous belt drive as claimed in claim 1, characterized in that the two wheels of a pair of wheels secured against rotation are rotatably mounted on a translatorily guided slide (13).

6. A synchronous belt drive as claimed in claim 1, characterized in that the wheels are rotatably mounted on a rotatable bracket (10).

7. A synchronous belt drive as claimed in claim 6, characterized in that the spacing between the rotatably interconnected wheels (5 and 6) is adjustable.

8. A synchronous belt drive as claimed in claim 7, characterized in that the wheels (3, 4, 5 and 6) are supported in the pivot points of four rhomboidally arranged and not rigidly connected rockers (20).

9. A synchronous belt drive as claimed in claim 7, characterized in that the two gears (14 and 15) are coupled with each other through another pair of gears (17) so that they are secured against rotation and the gears (17) engage each other with two rockers (18) and a coupler (19) and are engaged with the gears (14 and 15).

10. A synchronous belt drive comprising:
   first and second belt drive assemblies each having:
      a toothed belt with teeth on opposing first and second sides having first and second pitches respectively; and
      a driving toothed wheel, a driven toothed wheel, and at least one return wheel interconnected by said toothed belt;
      said driving toothed wheel engaging said teeth having said first pitch and said driven toothed wheel engaging said teeth having said second pitch;
   first coupling means for coupling said driving toothed wheels of said first and second belt drive assemblies to prevent independent rotation of said driving toothed wheels of said first and second belt drive assemblies;
   second coupling means for coupling said driven toothed wheels of said first and second belt drive assemblies to prevent independent rotation of said driven toothed wheels of said first and second belt drive assemblies; and
   said first and second pitches of said toothed belt of said first belt drive assembly being equal and said first and second pitches of said toothed belt of said second belt drive assembly being unequal such that products of a number of teeth of said driving wheel and said first pitch of each of said first and second belt drive assemblies are different.

11. A synchronous belt drive according to claim 10 wherein:
   said driving toothed wheels of said first and second belt drive assemblies have equal numbers of teeth; and
   said second pitches of said first and second belt drive assemblies being equal and said first pitches of said first and second belt drive assemblies being unequal.

12. A synchronous belt drive according to claim 10 wherein said driven toothed wheels of said first and second belt drive assemblies are rotatably mounted on a translatorily guided slide moveable relative to said driving wheels.

13. A synchronous belt drive according to claim 10 wherein said driving wheels are rotatably mounted in a fixed position and said driven wheels are rotatably mounted on a bracket rotatably mounted about said driving wheels.

14. A synchronous belt drive comprising:
   a toothed belt having teeth on opposing sides with differing first and second pitches;
   first, second and third wheels and at least one return wheel interconnected by said toothed belt, said second and third wheels having teeth;
   means for coupling said second and third wheels to prevent independent rotation of said second and third wheels;
   said second wheel engaging said teeth of said first pitch and said third wheel engaging said teeth of said second pitch;
   a product of a number of teeth of said second wheel and said first pitch and a product of a number of teeth of said third wheel and said second pitch differing from one another; and
   one of said second and third wheels being a driven wheel.

15. A synchronous belt drive according to claim 14 wherein said coupling means includes one of one-stage and multi-stage gearing for coupling said second and third wheels in a counter-rotating arrangement in a plane.

16. A synchronous belt drive according to claim 15 wherein the second and third wheels have the same number of teeth and numbers of said teeth on said opposing sides of said toothed belt differ by at least one.

17. A synchronous belt drive according to claim 14 wherein said coupling means includes adjustment means for adjusting a distance between said second and third wheels.

18. A synchronous belt drive according to claim 17 wherein the first, second, and third wheels are rotatably supported at pivot points of a link assembly having four rhomboidally arranged and pivotally connected links.

19. A synchronous belt drive according to claim 18 wherein said means for coupling said second and third wheels includes first and second gears held in engagement respectively with said second and third wheels by first and second links, and said first and second gears are held in engagement with one another by a coupler member.

20. A synchronous belt drive comprising:
   a toothed belt having teeth on opposing sides with differing first and second pitches;
   first, second and third wheels and at least one return wheel interconnected by said toothed belt, said second and third wheels having teeth;
   means for coupling said second and third wheels to prevent independent rotation of said second and third wheels;
   said second wheel engaging said teeth of said first pitch and said third wheel engaging said teeth of said second pitch;
   a product of a number of teeth of said second wheel and said first pitch and a product of a number of teeth of said third wheel and said second pitch differing from one another;
   mounting means for mounting said first wheel and said return wheel fixed with respect to one another;
   slide means for slidably supporting said second and third wheels on rotatable mounts to permit translational movement relative to said first wheel; and
   one of said second and third wheels being a driven wheel.

21. A synchronous belt drive comprising:
   a toothed belt having teeth on opposing sides with differing first and second pitches;
   a first and second wheels interconnected by said toothed belt, said first and second wheels having teeth;
   first mounting means for rotatably mounting said first and second wheels apart from one another and coupling means for coupling said second and third wheels to prevent independent rotation of said first and second wheels;

means for engaging said toothed belt with said first and second wheels such that said second wheel engages said teeth of said first pitch and said third wheel engages said teeth of said second pitch;

a product of a number of teeth of said second wheel and said first pitch and a product of a number of teeth of said third wheel and said second pitch differing from one another;

second mounting means for rotatably supporting said first mounting means at one of said first and second wheels such that said one of said first and second wheels is fixed with respect to said second mounting means to permit rotation of said first mounting means about an axis of said one of said first and second wheels; and one of said first and second wheels being a driven wheel.

* * * * *